Dec. 9, 1941.    W. C. LLOYD ET AL    2,265,534
INJECTION SYSTEM FOR INTERNAL COMBUSTION ENGINES
Filed July 29, 1938    2 Sheets-Sheet 2
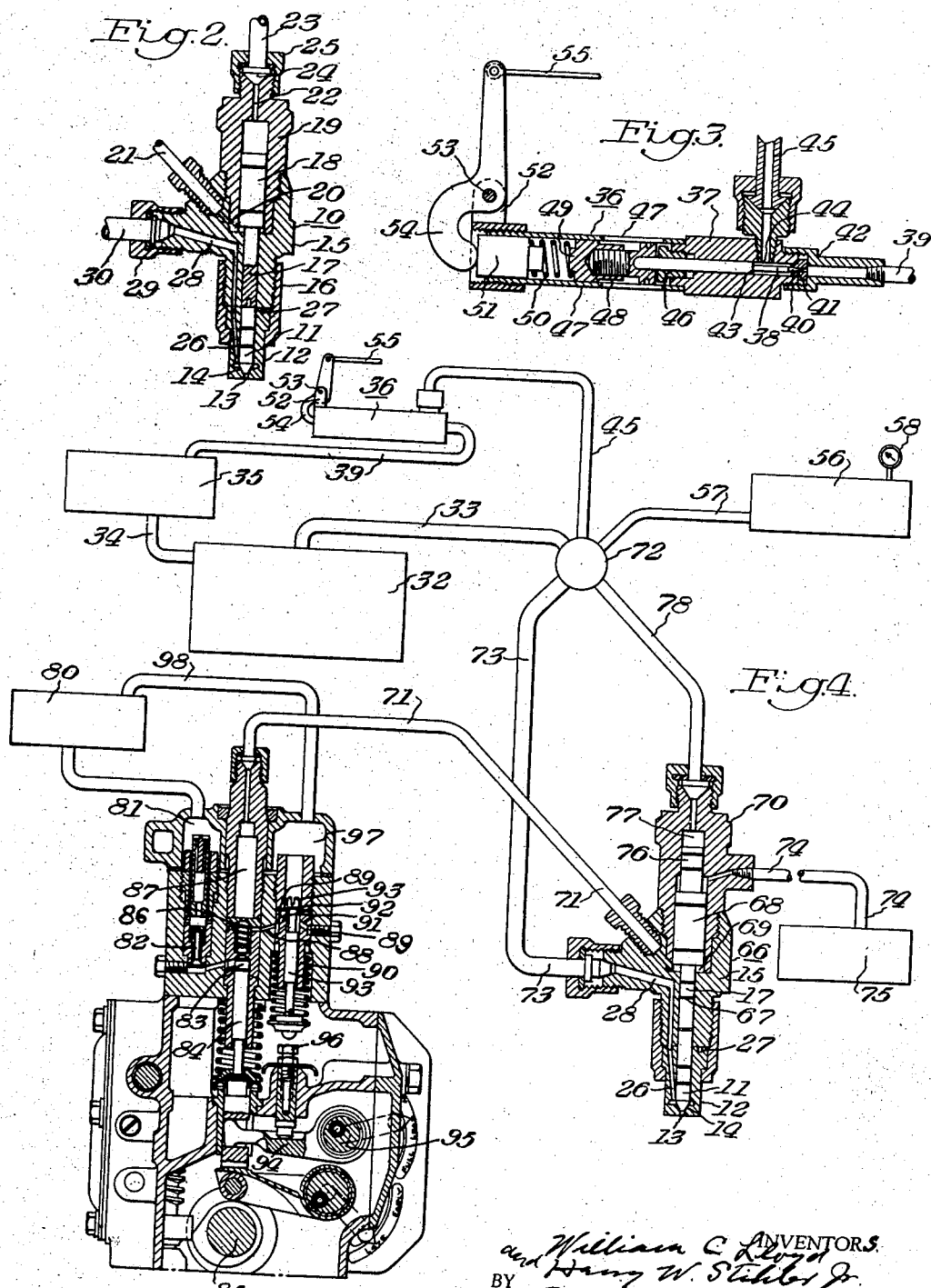

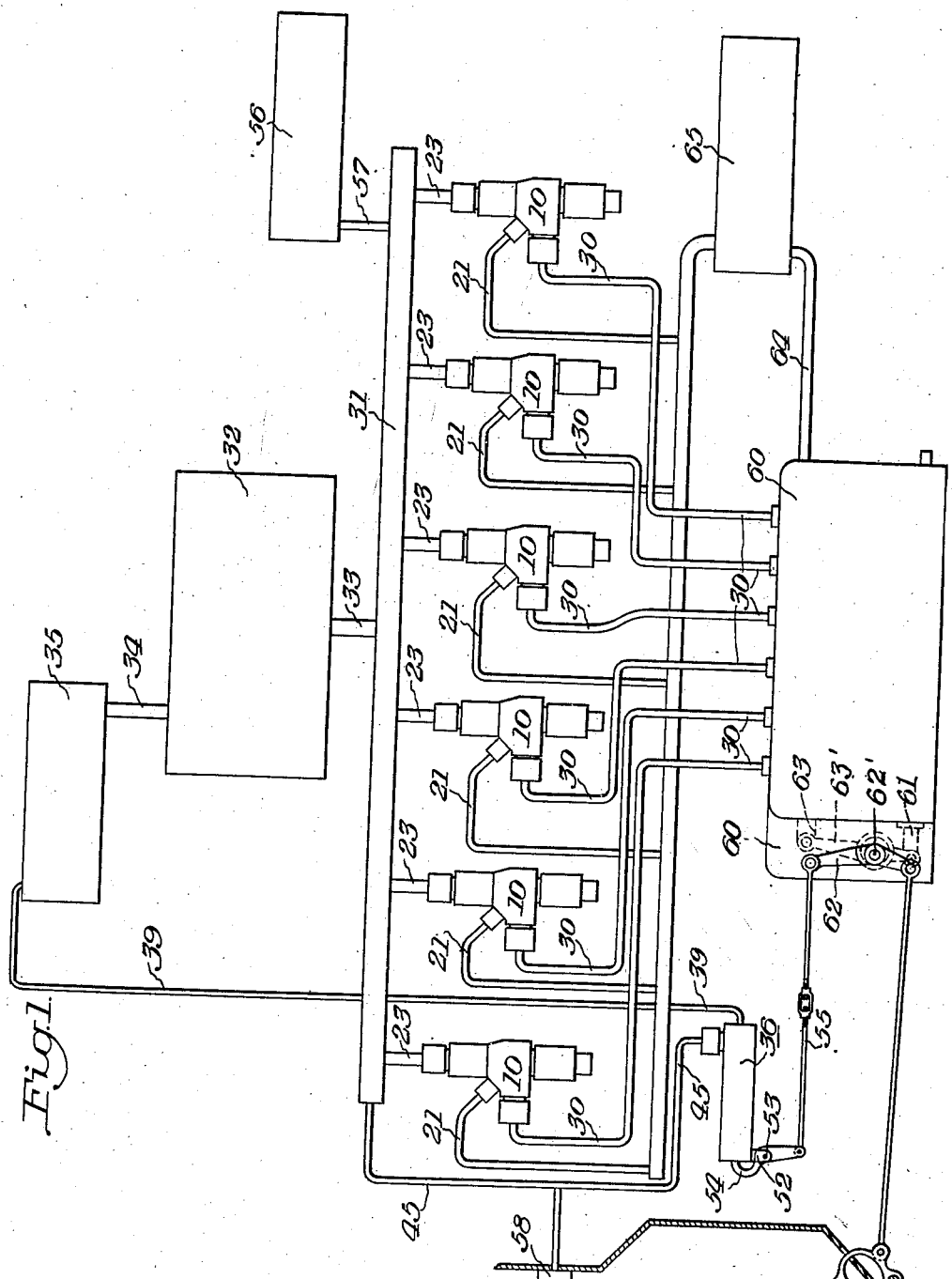

Patented Dec. 9, 1941

2,265,534

UNITED STATES PATENT OFFICE 2,265,534

INJECTION SYSTEM FOR INTERNAL COMBUSTION ENGINES

William Cleveland Lloyd, Detroit, and Henry William Stihler, Jr., Rasinville, Mich.; said Lloyd assignor to Bertha Shaughnessy, Corpus Christi, Tex.

Application July 29, 1938, Serial No. 221,984

14 Claims. (Cl. 123—140)

This invention relates generally to fuel injection systems for internal combustion engines and more particularly to the method and apparatus for regulating fuel injection by controlling injection pressures during operation.

This invention is particularly adapted to control solid injection systems for Diesel engines and is applicable for use with the present designs of fuel and pressure pumps, unloaders, governors and other parts used with Diesel engines which are not per se the subject matter of this invention.

The two well known general types of solid injection systems are the common rail and the jerk-pump. The injection nozzles used with these systems are provided with helical springs for holding the nozzle valves in their proper positions under a predetermined pressure, which pressure is set when the nozzles are assembled and is not intended to be changed. The valves of the fuel nozzles used with the common rail system are mechanically operated by a rocker arm or other similar mechanism, whereas the jerk-pump nozzle valve is lifted against the spring pressure by the pressure of the fuel. However in each case the characteristics of the springs vary for different operating speeds and also change after they have been in service, due to working and temperature conditions, all of which result in the variation of the characteristics of the fuel injection. The mechanical means for operating the valves in the nozzles used with the common rail systems also produce varying fuel injection conditions at different speeds and are also subjected to other mechanical limitations. The factors which change the characteristics of the fuel injection of the engine, over wide variations in speed and load, are readily shown by measuring the efficiency of the engine under such conditions. Each engine is designed to operate under a definite load within a rather limited speed range. The springs in the injection nozzles of an engine are set at definite pressures to produce these loading characteristics and as long as the engine is operated within this selected speed range it performs its work efficiently. However the difficulty lies in the fact that after the manufacturers have devoted extreme care in making an engine which has reasonable limitations the purchaser expects it to perform efficiently through a broad range of operating conditions and to continue to do so for a long period of time.

These and other difficulties which are experienced in the present practice of fuel injection for internal combustion engines, may be overcome by the use of the improvements set forth herein. The deleterious action of the spring loaded injection nozzle valves and valve operating mechanisms are not only eliminated but are replaced by a system that provides the same or equal pressures on all of the injection nozzle valves at all times, which pressures may be varied to suit variations in the loading and speed requirements of the engine.

The principal object of this invention is the provision of an injection system for broadening the operating range of an internal combustion engine.

Another object is the provision of a solid injection system for improving the operating efficiency of an internal combustion engine over extremely wide ranges of operating conditions.

Another object is the provision of a solid injection system which improves the operating characteristics of an internal combustion engine.

Another object is the provision of a solid injection system which eliminates the deleterious factors produced by the mechanical elements of the injection nozzle valve operating means and the disadvantages attendant therewith.

Another object is the provision of a simplified control of fuel injection for internal combustion engines.

Another object is the provision of simplified and improved injection nozzles.

Other objects and advantages appear hereinafter.

In the drawings practical embodiments illustrating the principles of this invention are illustrated wherein:

Fig. 1 is a diagrammatic representation of a solid fuel injection system embodying the features of this invention.

Fig. 2 is an enlarged sectional view of the fuel injection nozzle shown in Fig. 1.

Fig. 3 is an enlarged sectional view of the unloader shown in Fig. 1.

Fig. 4 is a diagrammatic representation, showing an injection nozzle and the fluid pressure operating pump in section, of a solid fuel injection system employing a modified form of injection nozzle and fluid pressure system.

The underlying principles making up this improved fuel injection system comprise the use of a fluid pressure system of the common rail type for controlling the opening pressure of the valve in the fuel injection nozzle which is operated by an independent jerk-pump fuel injection system.

The underlying principles of the modification is the use of a common rail fuel injection system with a fuel nozzle valve designed to be seated by the pressure of the fuel and operated by an independent jerk-pump fluid system. These two systems are illustrated diagrammatically in Figs. 1 and 4 respectively.

These principles may be practiced by the use of an improved and simplified design of a fluid actuated fuel nozzle injection valve, which eliminates the use of spring loaded valves and mechanical valve operating mechanisms. Again apparatus such as employed in the common rail and the jerk pump systems may also be used, which are highly developed owing to the fact that they have been employed separately as fuel injection systems and have proven themselves commercially successful within their separate fields.

It is also obvious that the improvements comprising this invention are adaptable for use with air injection nozzles, thereby eliminating the spring loaded valves and mechanical valve operating mechanisms common to that type of injection systems and the scope of the invention claimed herein includes this as well as other similar forms of fuel injection systems.

The principal object of this improvement is to provide a fuel injection system that enables one to have complete control of the injection pressure, timing and the metering of the fuel during the operation of the engine and with the use of gauges and other instruments the operator is constantly apprised of the actual conditions under which the engine is operating.

Referring to Fig. 2 of the drawings, 10 represents a fuel injection nozzle having a fluid actuated needle valve 11 arranged to be operated within the nozzle tip 12 for closing and opening the fuel nozzle tip orifice 13 by seating and unseating on the valve seat 14. The nozzle tip 12 is secured to the valve body 15 by means of the collar 16 which is threadably engaged therewith. The other end of the needle valve is provided with an extension of reduced diameter which telescopes within the short bore of the pressure stem 17 fitting snugly in the bore of the valve body 15. The other end of the pressure stem is provided with a piston head 18 which is preferably integral therewith and arranged to reciprocate in the bore of the cylinder 19 which is stepped into an enlarged bore in the upper end of the valve body and is threadably secured therewith.

The lower end of the cylinder bore is connected by a diagonally disposed passageway 20 through the wall of the valve body 15 and is provided with suitable means for securing the pipe line 21 thereto, for conveying the fuel leakage from the nozzle. The upper end of the cylinder bore is provided with the passageway 22 for connecting it with the pipe line 23 secured in sealing relation to the cylinder 19 by means of the ferrule 24 and the gland 25 threadably engaged thereto for connecting the fluid pressure system above the piston 18. A third passageway 26 for the fuel extends from an annular space above the valve seat 14 upwardly in the wall of the nozzle tip 12 to an annular groove 27 on the upper surface thereof and thence upwardly and outwardly through the wall of the valve body as shown at 28. The outer end of this passageway is provided with a ferrule and a gland member 29 for securing the fuel pipe line 30 thereto in proper sealing relation.

The diagrammatic representation shown in Fig. 1 illustrates a plurality of these fuel injection nozzles as applied to a fuel injection system wherein the fluid pressure lines 23 are connected to the common rail 31 which is merely a closed tubing preferably straight and provided with suitable means for connecting the pipe lines thereto. 32 represents a multi-cylinder pump provided with a common discharge line 33 connected to the common rail 31. The intake line 34 of the pump 32 is connected to the fluid reservoir 35.

36 represents a simple spring unloader, illustrated in detail in Fig. 3, and which is provided with a body member 37 having an axial bore for receiving the needle unloading valve stem 38. The end of the stem is provided with the valve face 40 arranged to seat on the unloader valve seat 41 secured to the body by means of the by-pass cap 42 having the fluid return line 39 connected thereto. The stem 38 is provided with a pressure step 43 adjacent the valve face thereby providing a fluid chamber 44 in the bore of the unloader body which is connected to the common rail by means of the pipe line 45. The other end of the stem 38 extends beyond the unloader body 37 and is sealed by a suitable packing and packing gland as indicated at 46.

A tubular casing 47 is secured to the body 37 and arranged to carry the adjustable unloader spindle 48 which is made in two parts with a threaded interengagement therebetween. One end of the spindle is provided with a short bore for receiving the end of the valve stem 38 and the other end is provided with a centrally disposed lug 49 for receiving the helical spring 50. The other end of the spring is held by a cylindrical portion integral with the spring follower 51. An extension 52 is secured to the end of the casing 47 and is provided with aligned holes for receiving the ends of the shaft 53 which pivotally supports the spring adjusting lever 54. The short arm of the lever 54 is provided with a cam face arranged to bear against the end of the spring follower and the long arm has the operating rod 55 pivotally connected thereto. This operating rod may be connected directly to the governor which controls the operation of the engine as shown, and it may also be connected through a series of bell crank levers and screw rods to the dashboard, thus enabling the operator to adjust the position of the lever 54, thereby controlling the pressure of the fuel in common rail independently of the operation of the governor. Connections of this character are common in the automotive industry and are therefore not shown in detail on the drawings.

56 represents an accumulator which is merely an enclosed tank filled with the fluid of the pressure system and is connected to the common rail by means of the line 57. The pressure gauge 58 may be connected to the common rail as shown, or to the accumulator, or any of the lines in communication therewith. This gauge is placed on the dashboard or operating panel to apprise the operator of the pressure of the fluid in the common rail system which in this instance represents the opening pressure of the valves in each of the injection nozzles 10. One important advantage of this fluid pressure system is the fact that each and every valve is subjected to the same opening pressure. In the present systems which employ spring seating fuel injection valves the pressure of the spring may be known at the time the valve is set but it is impossible to match the spring pressure of the valves in a single engine and after they have been installed the spring pressures vary, due to age, crystallization caused by working, temperature variations and many other factors. All of these disadvantages are eliminated by the fluid pressure control system and the additional advantage is gained through the automatic or manual control of the fluid pressure.

The fuel injection portion of the system shown in Fig. 1 is the ordinary jerk-pump type wherein 60 represents a fuel injection pump of the type known as the Bosch design which is provided with a governor built therein. The pump plungers are individually timed to deliver fuel to each injector nozzle 10 through the fuel lines 30 at the proper instant, and the quantity of fuel delivered to each injector is controlled by the governor 61 which is pivotally connected to and actuates the lever 63', thereby determining the position of the control rod rack 63 connected to the other end of the lever 63'. The lever 63' is pivoted on the eccentric shown in dotted lines, and which is preferably formed integral with the shaft 62'. The lever 63' and the governor 61 are enclosed in the pump housing. A second lever 62 is secured to the shaft 62' outside of the housing and is connected at one end to the operator's accelerator pedal and at the other end to the lever 54 as shown at Fig. 1. By operating the accelerator pedal the shaft 62' may be partially rotated, which changes the effective pivot point of the lever 63' through the eccentric upon which it is mounted. The operator may thus control the quantity of fuel fed to the injectors although the governor retains control of the movement of the rack 63 through the new or adjusted position of the pivot point of the lever 63'. Thus the governor functions at all times to produce the most efficient operation of the engine even though the operator changes the operating range by means of the accelerating pedal. However the accelerator pedal is usually adjusted to provide a wide margin, thus leaving the matter of the loading of the engine to the operator's good judgment, and it is up to him to refrain from unnecessary use of the reserve power beyond the rating of the engine.

The fuel is conveyed through the line 64 to the pump 60 from the fuel tank 65. The leakage return lines 21 may be directed back to the fuel tank 65 as shown in Fig. 1. However this leakage is very small and may be discharged to a separate tank or spilled, which is the practice of some of the manufacturers as a precaution against contamination of the fuel supply.

In Fig. 4 the fluid actuated fuel injection valve is operated by the jerk-pump system and the fuel is fed to the injection nozzles through a common rail fuel feeding system. The fuel injection nozzle 66 is provided with the fluid actuated valve 11 operating in the bore of the nozzle tip 12 for controlling the passage of the fuel out the discharge orifice 13 by seating and unseating on the valve seat 14.

The valve pressure stem 17 extends up through the bore of the body 15 and is provided with a series of labyrinth grooves 67 for checking leakage of fluid thereapast. The fluid actuated valve 11 is operated by independent fluid pressures acting on a differential piston formed integral with the upper end of the stem 17. The piston head 68 adjacent the stem 17 is preferably larger in diameter than the piston head 18 shown in Fig. 2 and is arranged to be operated in the enlarged bore 69 in the lower end of the cylinder 70. The line 71 is connected to the lower end of the cylinder bore 69 below the piston head 68 and is arranged to carry fluid under pressure from the jerk-pump for raising the piston to permit the valve 11 to open. Fuel is then admitted from the common rail 72 through the line 73, the passageways 28, the annular groove 27, the passage 26 to the fuel pocket around the valve face 14 in the nozzle tip. When the valve is raised from its seat the fuel under the pressure developed in the common rail passes through the orifice 13 to the engine cylinder.

The other end of the bore 69 above the piston 68 is connected to the line 74 which vents the intermediate section of the differential piston and conveys fluid, that may leak past the pistons, to the tank 75.

The upper head 76 of the differential piston is arranged to reciprocate within the bore 77 of the cylinder 70 and the upper end thereof is connected to the line 78 which conveys fluid under pressure from the common rail 72. The diameter of the piston head 76 is preferably larger than the diameter of the valve 11 but smaller than the diameter of the piston head 68. When the pressure in the jerk-pump line 71 falls below a predetermined amount the fluid pressure of the common rail is effective against the piston head 76 moving the differential piston and the stem 17 downwardly seating the valve 11.

The common rail fuel system is the same as the common rail fluid pressure system described with reference to Fig. 1. However the jerk-pump in the fluid pressure system shown in Fig. 4 is different from that employed in Fig. 1. This pump is of the type known as the M. A. N. design wherein the fluid is drawn from the tank 80 into the suction chamber 81, past the suction check valve 82 into the chamber 83 of the main pump plunger 84 which is actuated by the cam mechanism 85. The fluid is forced by the pump plunger past the check valve 86 into the discharge chamber 87 and thence through the line 71 to the lower end of the bore 69 in the injection nozzle 66.

The passageway 88 connects the discharge chamber 87 with the annular recess 89 in the perimetral surface of the by-pass valve sleeve 90 which is provided with a plurality of ports 91 opening to a chamber below the seat 92 of the by-pass valve 93. The by-pass valve is actuated by the cam mechanism 85 through the lever arm 94 pivotally supported on the governor controlled eccentric 95, and the tappet 96.

When the by-pass valve is raised off its seat the fluid under pressure in the discharge chamber 87 and its associated connections, is permitted to escape past the by-pass valve 93 into the by-pass chamber 97 and thence through the line 98 to the fluid supply reservoir 80.

The fluid pressure developed by the jerk-pump plunger thus raises the injector piston 68, lifting the nozzle valve 11 from its seat allowing the fuel to be discharged into the engine cylinder. The release of the jerk-pump fluid pressure by the by-pass valve permits the pressure of the fuel in the common rail to actuate the piston 76 thereby seating the valve 11.

The timing of the opening and closing of the injection nozzle valve is thus determined by the operation of the fluid pressure plunger 84 and the by-pass valve 93 which may be independently adjusted for the particular type of engine to which the fuel injection system is applied and they may be regulated while the engine is running by the operator for producing the proper running conditions of the engine to meet the changing of the loading conditions. The injection pressure of the fuel may also be regulated through the unloader 36 in the manner described in conjunction with the showing of Fig. 1.

Each of these fluid actuated systems for controlling the fuel injection of an internal combustion engine provide control over the timing, the fuel injection pressure, and the quantity of fuel metered during the operation of the engine. These regulations may be completely controlled by the governors through electro-mechanical instruments well known in the art and supplemented by manual control from the operating panel or dashboard of the machine. These fuel injection systems have been applied to an internal combustion engine of the Diesel type and it was found that aside from broadening the regulation thereof they produce a higher rating of the engine owing to the increased efficiency obtained by providing uniform injection pressures and fuel metering in each cylinder. This is an important object of this invention. The time lag of the fluid systems may be accurately controlled, whereas the time lag and flutter action of the spring loaded nozzle valves and valve actuation rocker mechanisms vary for different rates of speed and thereby lose their calculated precision which creates variations of fuel metering and injection pressures between the cylinders of the same engine. These factors are believed to have created more difficulties and erratic results in the present practice than any other part of this type of internal combustion engine. It has been found that an engine provided with these improved systems of injection control consumes less fuel per horse power hour throughout its complete operating range. By controlling the opening pressures of the nozzle valves the engine will not smoke or produce deterioration when idling or under load at any speed. The regulation of the metered quantity of the fuel in a charge, together with the pressure thereof in conjunction with the regulation of the nozzle valve opening pressure provides an operating efficiency of the same engine which is unattainable by the present practice of injection system.

We claim:

1. A fuel injection system for internal combustion engines comprising the combination of an injection nozzle, a fluid pressure-operated valve in the nozzle and having a face against which pressure acts to close the valve and a second face on which pressure may be imposed to open the valve, two sources of independent fluids under pressure, means for constantly imposing fluid continuously under pressure from one of said sources on the first mentioned face, and means for periodically imposing pressure impulses from the other source on the second mentioned face sufficient to open the valve against the influence of the pressure imposed on the first mentioned face.

2. A fuel injection system for internal combustion engines comprising the combination of an injection nozzle having a fuel chamber adjacent its orifice, a fluid pressure-operated valve in the nozzle to control the discharge of fuel from the orifice and having a face against which pressure acts to close the valve and a second face on which pressure may be imposed to open the valve, a source of fluid fuel under pressure, an independent source of fluid under pressure, means for constantly maintaining fuel continuously under pressure in the fuel chamber and to impose said fuel on the first mentioned face to close the orifice, and means for periodically admitting fluid pressure from the second named source against the second named face to open the valve against fuel pressure to permit the fuel to be discharged from the chamber and through the orifice.

3. A fuel injection system for internal combustion engines comprising the combination of an injection nozzle having a fuel chamber adjacent its orifice, a fluid pressure-operated valve in the nozzle to control the discharge of fuel from the orifice and having a face against which pressure acts to close the valve and a second face on which pressure may be imposed to open the valve, a source of fluid under pressure, a second independent source of fuel under pressure connected with said fuel chamber, means for constantly imposing fluid continuously under pressure on the first mentioned face to close the orifice, and means for periodically admitting fuel pressure from the second named source against the second named face to open the valve against fluid pressure to permit fuel to be discharged from the chamber and through the orifice.

4. A fuel injection system for internal combustion engines comprising the combination of an injection nozzle, a fluid pressure-operated valve in the nozzle and having a face against which pressure acts to close the valve and a second face on which pressure may be imposed to open the valve, two sources of independent fluids under pressure, means for constantly imposing fluid continuously under pressure from one of said sources on the first mentioned face, means for periodically imposing pressure impulses from the other source on the second mentioned face sufficient to open the valve against the influence of the pressure imposed on the first mentioned face, and means for varying the pressure of the fluid effective to close the valve to regulate the pressure of injection.

5. A fuel injection system for internal combustion engines comprising the combination of an injection nozzle, a fluid pressure-operated valve in the nozzle and having a face against which pressure acts to close the valve and a second face on which pressure may be imposed to open the valve, two sources of independent fluids under pressure, means for constantly imposing fluid continuously under pressure from one of said sources on the first mentioned face means for periodically imposing pressure impulses from the other source on the second mentioned face sufficient to open the valve against the influence of the pressure imposed on the first mentioned face, and means responsive to the speed of the engine for varying the pressure of the fluid effective to close the valve to regulate the pressure required to open the valve.

6. A fuel injection system for internal combustion engines comprising the combination of an injection nozzle, a fluid pressure-operated valve in the nozzle and having a face against which pressure acts to close the valve and a second face on which pressure may be imposed to open the valve, two sources of independent fluids under pressure, means for constantly imposing fluid continuously under pressure from one of said sources on the first mentioned face, means for periodically imposing pressure impulses from the other source on the second mentioned face sufficient to open the valve against the influence of the pressure imposed on the first mentioned face, and means for varying the pressure and duration of the pressure impulses imposed on the second mentioned face for regulating the fuel charges supplied to the engine.

7. A fuel injection system for internal combustion engines comprising the combination of an injection nozzle, a fluid pressure-operated valve in the nozzle and having a face against which pressure acts to close the valve and a second face on which pressure may be imposed to open the valve, two sources of independent fluids under pressure, means for constantly imposing fluid continuously under pressure from one of said sources on the first mentioned face, means for periodically imposing pressure impulses from the other source on the second mentioned face sufficient to open the valve against the influence of the pressure imposed on the first mentioned face, and means responsive to the speed of the engine for varying the pressure and duration of the pressure impulses imposed on the second mentioned face for regulating the fuel charges supplied to the engine.

8. A fuel injection system for internal combustion engines comprising the combination of a plurality of injection nozzles, a fluid pressure-operated valve in each nozzle, each of said valves having a face against which pressure acts to close the valve and a second face on which pressure may be imposed to open the valve, two sources of independent fluids under pressure, a common flow passageway arranged constantly to impose fluid continuously under pressure from one of said sources on the first mentioned faces, an independent passageway for each valve communicating with the second source for imposing fluid on the second named faces, and means for periodically increasing the fluid pressure in said independent passageways to open the several valves successively against the fluid pressure imposed on the first named faces.

9. A fuel injection system for internal combustion engines comprising the combination of a plurality of injection nozzles each having a fuel chamber adjacent its orifice, a fluid pressure-operated valve in each nozzle to control the discharge of fuel from the orifice, each of said valves having a face against which pressure acts to close the valve and a second face on which pressure may be imposed to open the valve, a source of fluid fuel under pressure, an independent source of fluid under pressure, a common flow passageway arranged constantly to maintain fuel continuously under pressure in the fuel chamber and to impose said fuel on the first mentioned faces to close the nozzle orifices, an independent passageway for each valve communicating with the second mentioned source for imposing fluid on the second mentioned faces, and means for periodically increasing the fluid pressure in said independent passageways to open the several valves successively against fuel pressure imposed on the first mentioned face to permit the fuel to be discharged from the chamber and through the orifice.

10. A fuel injection system for internal combustion engines comprising the combination of a plurality of injection nozzles each having a fuel chamber adjacent its orifice, a fluid pressure-operated valve in each nozzle to control the discharge of fuel from the orifice, each of said valves having a face against which pressure acts to close the valve and a second face on which pressure may be imposed to open the valve, a source of fluid under pressure, an independent source of fluid under pressure, a common flow passageway arranged constantly to maintain fluid continuously under pressure imposed on the first mentioned faces to close the nozzle orifices, and an independent passageway for each valve connecting its fuel chamber with the source of fuel and for imposing fuel on the second mentioned faces, and means for periodically increasing the fuel pressure in said independent passageways to open the several valves successively against the fluid pressure imposed on the first mentioned faces to permit the fuel to be discharged from the chamber and through the orifice.

11. In an injection valve mechanism for internal combustion engines, the combination of a sectional body member, a pressure responsive element comprising a reciprocal valve member having a stem with a valve face on one end and a head on the other, a small bore in the one section of said body member for receiving the stem, a valve seat at the end of said bore arranged to coact with the valve face for controlling the admission of fuel to the engine, a larger bore in the other section of said body member for receiving said head, a common rail pressure device connected to the larger bore to regulate the pressure of fuel injection through the pressure responsive element, and a jerk pump device connected to the small bore adjacent the valve seat for forcing measured quantities of fuel for each injection through the valve by counteracting the force of the common rail pressure.

12. In an injection valve mechanism for internal combustion engines, the combination of a sectional body member, a pressure responsive element comprising a reciprocal valve member having a stem with a valve face on one end and a differential piston with opposed heads on the other end, a small bore in the one section of said body member for receiving the stem, a valve seat at the end of said bore arranged to coact with the valve face for controlling the admission of fuel to the engine, a large differential bore in the other section of said body member in which said piston works, a common rail pressure device connected to one end of the differential bore to regulate the pressure of fuel injection through the pressure responsive element and also connected to the small bore adjacent the valve seat, and a jerk pump device connected to the other end of the differential bore for counteracting the force of the common rail pressure on the pressure responsive element.

13. A fuel injection mechanism for internal combustion engines comprising the combination of a plurality of injector nozzles each having a fuel chamber with an orifice and a fluid actuated valve to control the admission of fuel through the orifice to the engine, a pressure chamber associated with each nozzle, the valve having a face exposed in said pressure chamber against which pressure acts to close the valve, a common flow passageway connected to the pressure chamber of each injection nozzle, a pump for continuously supplying fluid under pressure to the passageway, a fuel pump having a plurality of pistons each of which is independently connected to the fuel chamber of a corresponding nozzle for actuating the valve therein against the influence of the fluid pressure in the corresponding pressure chamber to permit the injection of fuel to operate the engine, control means for regulating the displacement of each piston in the fuel pump, an unloader control for regulating the pressure of the fluid in the common flow passageway, manually operated means for actuating both of said control means, and a governor operated by the speed of the engine for varying the effect of said controls.

14. A fuel injection mechanism for internal combustion engines comprising a plurality of injector nozzles each provided with a fuel chamber; an orifice and a fluid-actuated valve to control the passage of fuel through the nozzle, a pair of pressure chambers associated with each nozzle, the valve having a face exposed in one of the pressure chambers against which pressure acts to close the valve and another face exposed in the other pressure chamber against which pressure may be imposed to open the valve, a common flow passageway connected to the fuel chamber and the first named pressure chamber of each injection nozzle, a pump for continuously supplying fuel under pressure to the passageway, a second pump having a plurality of pistons each of which is independently connected to one of the second named pressure chambers for actuating the corresponding valve against the influence of the fluid pressure in the first named pressure chamber of the corresponding pair to permit fuel to be injected through the nozzle to operate the engine, control means for regulating the displacement of each piston in the second pump, an unloader control for regulating the pressure of the fuel in the common flow passageway, manually operated means for actuating both of said control means, and a governor operated by the speed of the engine for varying the effect of said controls.

WILLIAM CLEVELAND LLOYD.
HENRY WILLIAM STIHLER, Jr.